United States Patent
Hirata (10) Patent No.: US 11,207,984 B2
(45) Date of Patent: Dec. 28, 2021

(54) DRIVE SOURCE CONTROL DEVICE

(71) Applicant: NTN CORPORATION, Osaka (JP)

(72) Inventor: Junichi Hirata, Iwata (JP)

(73) Assignee: NTN CORPORATION, Osaka (JP)

( * ) Notice: Subject to any disclaimer, the term of this patent is extended or adjusted under 35 U.S.C. 154(b) by 345 days.

(21) Appl. No.: 16/371,820

(22) Filed: Apr. 1, 2019

(65) Prior Publication Data
US 2019/0232799 A1   Aug. 1, 2019

Related U.S. Application Data

(63) Continuation of application No. PCT/JP2017/035440, filed on Sep. 29, 2017.

(30) Foreign Application Priority Data

Oct. 3, 2016 (JP) .............................. JP2016-195603

(51) Int. Cl.
*F16H 48/36* (2012.01)
*B60W 10/08* (2006.01)
(Continued)

(52) U.S. Cl.
CPC .................. *B60L 15/20* (2013.01); *B60L 9/18* (2013.01); *B60W 10/08* (2013.01);
(Continued)

(58) Field of Classification Search
CPC ........... B60L 15/20; B60L 9/18; B60W 10/08; B60W 30/045; B60W 2710/083; F16H 48/10; F16H 48/36
See application file for complete search history.

(56) References Cited

U.S. PATENT DOCUMENTS 8,177,007 B2  5/2012 Abe et al.
8,972,139 B2  3/2015 Shinohara et al.
(Continued)

FOREIGN PATENT DOCUMENTS

CN   101678776 A   3/2010
CN   103171430 A   6/2013
(Continued)

OTHER PUBLICATIONS

English Translation by WIPO of the International Preliminary Report on Patentability dated Apr. 18, 2019 in corresponding International Patent Application No. PCT/JP2017/035440 (7 pages).
(Continued)

*Primary Examiner* — Tisha D Lewis (57) ABSTRACT

Provided is a drive source control device (67) for controlling two drive sources (2L, 2R) of a vehicle. The vehicle including the two drive sources (2L, 2R), left and right drive wheels (61L, 61R), and a power transmission device (3) disposed among the two drive sources (2L, 2R) and the drive wheels (61L, 61R). The device (3) distributes powers from the two drive sources (2L, 2R) to the wheels (61L, 61R) to drive the wheels (61L, 61R). The drive source control device (67) includes: an angular acceleration calculation (71) to calculate angular accelerations of the drive wheels (61L, 61R) and/or angular accelerations of the drive sources (2L, 2R); and a torque correction (68) to, using the angular accelerations calculated by the angular acceleration calculation (71), correct command values for respective outputs of the drive sources (2L, 2R).

6 Claims, 8 Drawing Sheets

(51) Int. Cl.
*B60L 15/20* (2006.01)
*F16H 48/10* (2012.01)
*B60W 30/045* (2012.01)
*G01P 15/16* (2013.01)
*B60L 9/18* (2006.01)

(52) U.S. Cl.
CPC .......... *B60W 30/045* (2013.01); *F16H 48/10* (2013.01); *F16H 48/36* (2013.01); *G01P 15/165* (2013.01); *B60W 2710/083* (2013.01); *Y02T 10/72* (2013.01)

(56) References Cited

U.S. PATENT DOCUMENTS

| | | | |
|---|---|---|---|
| 9,139,195 | B2 | 9/2015 | Noguchi |
| 9,205,760 | B2 | 12/2015 | Makino |
| 9,550,435 | B2 | 1/2017 | Ozaki et al. |
| 10,442,282 | B2 | 10/2019 | Shinohara et al. |
| 2009/0038866 | A1 | 2/2009 | Abe et al. |
| 2013/0165293 | A1 | 6/2013 | Shinohara et al. |
| 2013/0218381 | A1 | 8/2013 | Shinohara et al. |
| 2013/0261863 | A1 | 10/2013 | Noguchi |
| 2014/0330470 | A1* | 11/2014 | Ozaki ................ B60L 15/2036 701/22 |
| 2015/0012158 | A1 | 1/2015 | Makino |
| 2017/0349038 | A1 | 12/2017 | Shinohara et al. |

FOREIGN PATENT DOCUMENTS

| | | |
|---|---|---|
| CN | 103358898 A | 10/2013 |
| CN | 103946060 A | 7/2014 |
| CN | 104080645 A | 10/2014 |
| EP | 2149474 | 2/2010 |
| JP | 2008-295173 | 12/2008 |
| JP | 2011-130628 | 6/2011 |
| JP | 4907390 | 3/2012 |
| JP | 2013-172574 | 9/2013 |
| JP | 2015-21594 | 2/2015 |

OTHER PUBLICATIONS

International Search Report dated Dec. 19, 2017 in corresponding International Application No. PCT/JP2017/035440.
Extended and Supplementary Search Report dated Apr. 28, 2020 in corresponding European Patent Application No. 17858302.07 (8 pages).
Chinese Office Action dated Sep. 13, 2021, in Chinese Patent Application No. 201780061171.7 (17 pages including translation).

* cited by examiner

DRIVE SOURCE CONTROL DEVICE

CROSS REFERENCE TO THE RELATED APPLICATION

This application is a continuation application, under 35 U.S.C. § 111(a), of international application No. PCT/JP2017/035440, filed Sep. 29, 2017, which claims Convention priority to Japanese patent application No. 2016-195603, filed Oct. 3, 2016, the entire disclosure of which is herein incorporated by reference as a part of this application.

BACKGROUND OF THE INVENTION

Field of the Invention

The present invention relates to a drive source control device, and for example, relates to a drive source control device for a vehicle driving device which transmits driving torques generated from two independent drive sources, to left and right drive wheels, with a torque difference therebetween amplified.

Description of Related Art

In order to achieve smooth turning traveling of a vehicle or suppress change in the behavior of a vehicle such as extreme understeer or extreme oversteer, it may be effective to generate a great driving torque difference between left and right drive wheels. A vehicle driving device is thus disclosed in which a gear device having two planetary gear mechanisms combined is provided between two drive sources and left and right drive wheels so as to amplify the torque difference (Patent Documents 1 and 2).

For a device that generates a torque difference between left and right wheels of a vehicle, a control device is disclosed which performs correction by an inertial force of a motor in the generation of the torque difference (Patent Document 3).

RELATED DOCUMENT

Patent Document

[Patent Document 1] JP Laid-open Patent Publication No. 2015-21594
[Patent Document 2] JP Patent No. 4907390
[Patent Document 3] JP Laid-open Patent Publication No. 2011-130628

SUMMARY OF THE INVENTION

In the vehicle driving device shown in Patent Documents 1 and 2, in the case where angular velocity changes in one of the left and right drive wheels, an inertial force depending on a moment of inertia and angular accelerations of a wheel, a gear shaft, a motor, and the like to which the angular velocity change transfers, is transferred as a torque to the other drive wheel via the planetary gear mechanism in the gear device. For example, if the drive wheel on the turning inner wheel side lifts and spins while the vehicle is turning and accelerating, the inertial force is applied as a driving torque to the drive wheel on the turning outer wheel side, so that a torque different from a command torque issued from a high-order ECU is outputted. As a result, the behavior of the vehicle might become unstable.

In Patent Document 3, the inertial force is calculated from a rotation speed difference between the left and right wheels and the moment of inertia of the motor, to correct the torque. However, in the vehicle driving device having the configuration shown in Patent Documents 1 and 2, since a rotation speed difference between the left and right wheels is caused by a rotation speed difference between two motors, it is difficult to appropriately correct the torque by only the inertial force of one motor.

An object of the present invention is to provide a drive source control device that, even in the case where angular velocity changes in one or both of the left and right drive wheels, can output a torque in accordance with a supplied command value and stabilize the behavior of the vehicle.

In the following description, the reference characters in the embodiments are used for convenience sake in order to facilitate the understanding.

A drive source control device 67 according to the present invention is a drive source control device 67 for controlling two drive sources 2L, 2R of a vehicle, the vehicle including the two drive sources 2L, 2R, left and right drive wheels 61L, 61R, and a power transmission device 3 disposed among the two drive sources 2L, 2R and the left and right drive wheels 61L, 61R, the power transmission device 3 being configured to distribute powers from the two drive sources 2L, 2R to the left and right drive wheels 61L, 61R to drive the left and right drive wheels 61L, 61R. The drive source control device 67 includes: an angular acceleration calculation module 71 configured to calculate either (a) angular accelerations of the respective left and right drive wheels 61L, 61R or (b) angular accelerations of the two respective drive sources 2L, 2R, or both (a) and (b); and a correction module 68 configured to, using the angular accelerations calculated by the angular acceleration calculation module 71 and in accordance with a predetermined condition, correct command values for respective outputs of the two drive sources 2L, 2R, the command values being supplied from a command module 66a.

The predetermined condition is any condition that is determined depending on designing or the like, and is, for example, determined by figuring out an appropriate condition through examination and/or simulation.

In the above configuration, the angular acceleration calculation module 71 calculates the angular accelerations of the respective drive wheels 61L, 61R or the respective drive sources 2L, 2R. Using the calculated angular accelerations, the correction module 68 corrects the command values for respective outputs of the two respective drive sources 2L, 2R supplied from the command module 66a, in accordance with a predetermined condition. For example, when an angular acceleration occurs in one drive wheel 61L (61R) of the left and right drive wheels 61L, 61R, the command values for respective outputs of the two respective drive sources 2L, 2R are corrected so as to apply a torque in a direction opposite to the direction of the angular acceleration, to the other drive wheel 61R (61L) of the left and right drive wheels 61L, 61R. Therefore, even if undesired change in angular velocity occurs in one or both of the left and right drive wheels 61L, 61R of the vehicle, it is possible to output torques in accordance with the command values supplied from the command module 66a. Thus, the vehicle behavior can be stabilized.

The correction module 68 may be configured to correct the command values for the respective outputs of the two respective drive sources 2L, 2R, using the angular accelerations calculated by the angular acceleration calculation module 71, and in accordance with a moment of inertia of a predetermined rotary portion and a number of teeth of a gear of the power transmission device 3. The predetermined rotary portion is any rotary portion (rotary component or rotary part) determined depending on designing or the like, and is, for example, determined by figuring out an appropriate rotary portion through examination and/or simulation. The above configuration enables the correction module 68 to correct the command values for respective outputs of the two drive sources 2L, 2R so as to eliminate influence of the inertial force.

The power transmission device 3 may include a torque difference amplification device 30. The torque difference amplification device 30 has two planetary gear mechanisms 30L, 30R and amplifies a difference between torques generated by the two drive sources 2L, 2R. In this case, it is possible to achieve smooth turning traveling of the vehicle by the torque difference amplification device 30 amplifying the difference between torques generated by the two drive sources 2L, 2R. Also in the vehicle provided with the torque difference amplification device 30 as described above, it is possible to output torques in accordance with the command values supplied from the command module 66a.

The correction module 68 may be configured to correct the command values for the respective outputs of the two respective drive sources 2L, 2R, using the angular acceleration of at least one 61L (61R) of the left and right drive wheels 61L, 61R. The correction module 68 may be configured to correct the command values for the respective outputs of the two respective drive sources 2L, 2R, using the angular accelerations of the two respective drive sources 2L, 2R.

The correction module 68 may be configured to correct the command values for the respective outputs of the two drive sources 2L, 2R, when an angular acceleration occurs in one drive wheel 61L (61R) of the left and right drive wheels 61L, 61R, so as to apply a torque in a direction opposite to a direction of the angular acceleration, to the other drive wheel 61R (61L) of the left and right drive wheels. Thus, for the other drive wheel 61R (61L), it is possible to perform correction based on the inertial force so as to apply a torque in a direction opposite to the direction of the angular acceleration of the one drive wheel 61L (61R).

The correction module 68 may be configured to correct the command values for the respective outputs of the two respective drive sources 2L, 2R, when an angular acceleration occurs in one drive wheel 61L (61R) of the left and right drive wheels 61L, 61R, so as to apply a torque in the same direction as a direction of the angular acceleration, to the one drive wheel 61L (61R). Thus, for the drive wheel 61L (61R) in which the angular acceleration occurs, it is possible to perform correction based on the inertial force so as to apply a torque in the same direction as the direction of the angular acceleration.

A determination module 73 may be provided which is configured to determine whether or not the angular acceleration calculated by the angular acceleration calculation module 71 is greater than a threshold value, and only when the determination module 73 determines that the angular acceleration is greater than the threshold value, the correction module 68 may correct the command values for the respective outputs of the two respective drive sources 2L, 2R. The threshold value is any threshold value determined depending on designing or the like, and is, for example, determined by figuring out an appropriate threshold value through examination and/or simulation. In the above configuration, when the angular accelerations of the drive wheels 61L, 61R are not greater than the threshold value, i.e., are small, correction for the command values is not performed, whereby the calculation load on the drive source control device 67 can be suppressed and unnecessary torque variation due to torque correction being constantly performed can be suppressed.

A vehicle according to the present invention is the vehicle including the drive source control device 67. In this case, even if undesired change in angular velocity occurs in one or both of the left and right drive wheels 61L, 61R of the vehicle, it is possible to output torques in accordance with the command values supplied from the command module 66a. Thus, the vehicle behavior can be stabilized.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
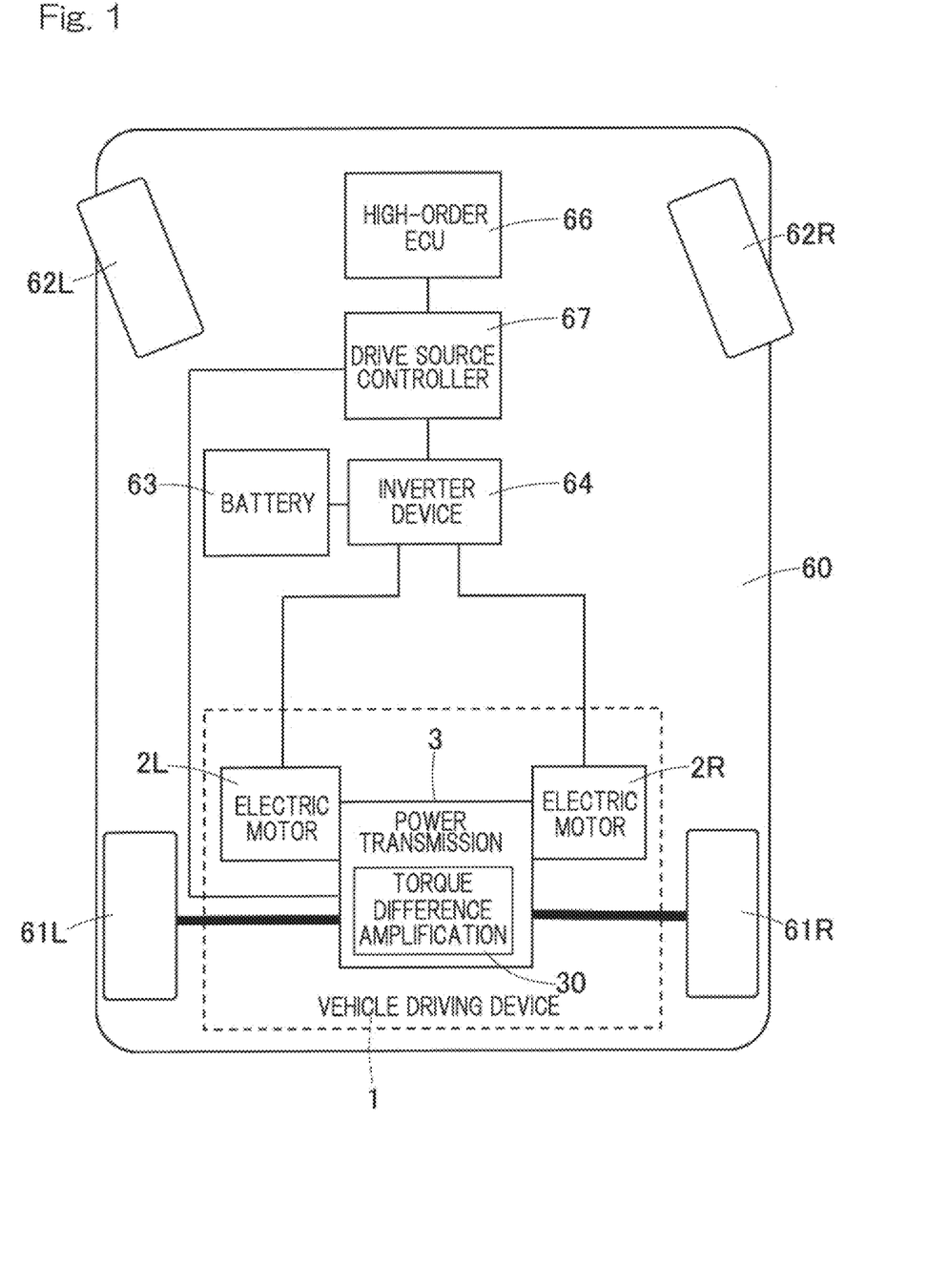
FIG. 1 is a block diagram showing the conceptual configuration of a vehicle provided with a drive source control device according to the first embodiment of the present invention, and a vehicle driving device.

A drive source control device according to the first embodiment of the present invention and a vehicle provided with the drive source control device will be described with reference to FIG. 1 to FIG. 7. FIG. 1 is a block diagram showing the conceptual configuration of a vehicle (electric vehicle) provided with the drive source control device and a vehicle driving device. This vehicle is a rear wheel drive type, and includes a chassis 60, drive wheels 61L, 61R which are rear wheels, front wheels 62L, 62R, a vehicle driving device 1, a high-order ECU 66, a drive source control device 67, a battery 63, an inverter device 64, and the like.

The vehicle driving device 1 includes first and second electric motors 2L, 2R and a power transmission device 3. The first and second electric motors 2L, 2R are two drive sources that are mounted to the vehicle and can be controlled independently of each other. The power transmission device is provided between the first and second electric motors 2L, 2R and the drive wheels 61L, 61R. In the present disclosure, the terms "first" and "second" do not indicate an order but are merely used for discrimination. Also, the terms "left" and "right" are irrelevant to superiority/inferiority and are merely used for discrimination.

<Schematic Configuration of Control System>

The high-order ECU 66 is a high-order control means for the drive source control device 67, and for example, has a function of performing integrated control and cooperative control for the entire vehicle, and a function of generating braking/driving torque command values for the left and right drive wheels 61L, 61R. The high-order ECU 66 generates braking/driving torque command values (command values for outputs) for left and right, on the basis of an acceleration command outputted from an acceleration manipulation unit (not shown), a deceleration command outputted from a brake manipulation unit (not shown), and a turning command outputted from a steering angle sensor or the like (not shown).

The drive source control device 67 supplies motor torque command values to the inverter device 64 on the basis of the braking/driving torque command values for left and right supplied from the high-order ECU 66. Thus, the first and second electric motors 2L, 2R are controlled independently of each other. The inverter device 64 converts DC power of the battery 63 to AC power for driving the first and second electric motors 2L, 2R. The inverter device 64 controls a current supplied from the battery 63 and drives the first and second electric motors 2L, 2R so that torques outputted from the first and second electric motors 2L, 2R are equal to the motor torque command values. The outputs from the vehicle driving device 1 are transmitted to the left and right drive wheels 61L, 61R via respective constant-velocity joints.

<Vehicle Driving Device 1>
<<First and Second Electric Motors 2L, 2R>>

Figure 2:
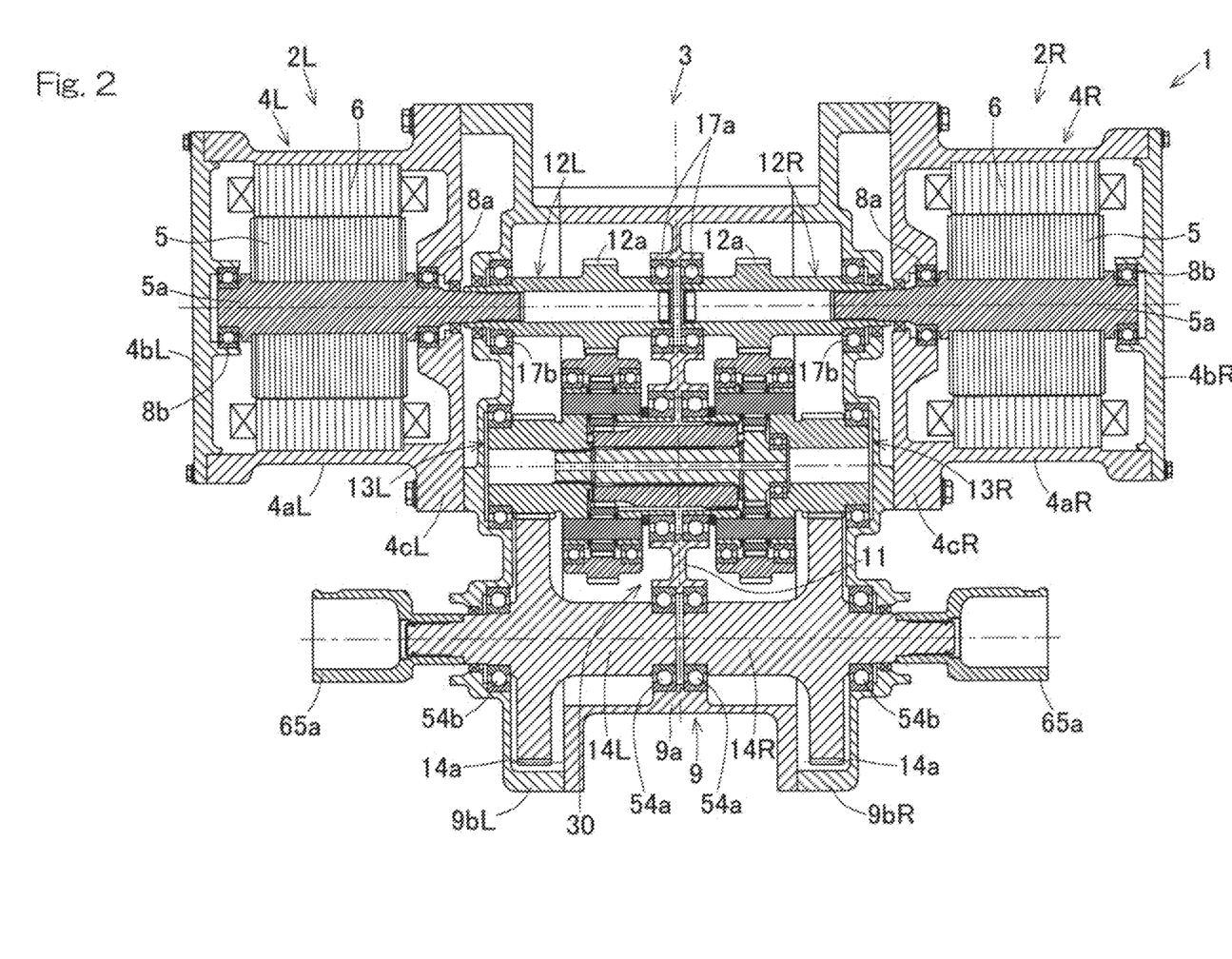
FIG. 2 is a sectional view of the vehicle driving device shown in FIG. 1.

In the present embodiment, the first and second electric motors 2L, 2R in the vehicle driving device 1 are electric motors having the same maximum output and based on the same standard. As shown in FIG. 2, the first and second electric motors 2L, 2R have motor housings 4L, 4R, stators 6, 6, and rotors 5, 5, respectively. The first and second electric motors 2L, 2R are a radial gap type in which the stators 6, 6 are provided on the inner circumferential surfaces of the motor housings 4L, 4R, and the rotor 5 is provided on the inner circumference of each stator 6 with a gap therebetween.

The motor housings 4L, 4R have cylindrical motor housing bodies 4aL, 4aR, outer side walls 4bL, 4bR, and inner side walls 4cL, 4cR, respectively. The outer side walls 4bL, 4bR close the outer side surfaces on the outboard side of the motor housing bodies 4aL, 4aR. The inner side walls 4cL, 4cR are provided on the inner side surfaces on the inboard side of the motor housing bodies 4aL, 4aR, and form separation walls for separation from the power transmission device 3. The inner side walls 4cL, 4cR have openings through which motor shafts 5a are led out to the inboard side. As used herein, in a state where the vehicle driving device 1 is mounted to the vehicle, a side outward in the vehicle width direction of the vehicle is referred to as outboard side, and a side toward the center in the vehicle width direction of the vehicle is referred to as inboard side.

The stators 6, 6 are fitted and fixed to the inner circumferential surfaces of the motor housing bodies 4aL, 4aR, respectively. Each rotor 5 has the motor shaft 5a at the center part. The inner side walls 4cL, 4cR are each provided with a rolling bearing 8a, and the outer side walls 4bL, 4bR are also each provided with a rolling bearing 8b. The motor shafts 5a, 5a are rotatably supported by the motor housings 4L, 4R via the rolling bearings 8a, 8b, respectively. The left and right motor shafts 5a, 5a are provided on the same axis (coaxially).

<<Power Transmission Device 3>>

The power transmission device 3 has a power transmission device housing 9. Further, the power transmission device 3 has two left and right input gear shafts 12L, 12R, two left and right intermediate gear shafts 13L, 13R, two left and right output gear shafts 14L, 14R, and a torque difference amplification device 30. The power transmission device 3 amplifies a difference between torques (driving torques) inputted from the motor shafts 5a of the first and second electric motors 2L, 2R by the torque difference amplification device 30, and transmits the resultant torques to the drive wheels 61L, 61R (FIG. 1).

The power transmission device housing 9 houses the above gear shafts and the torque difference amplification device 30. The power transmission device housing 9 has such a three-piece structure as to be divided into three pieces in a direction perpendicular to the axial direction of the gear shafts. Specifically, the power transmission device housing 9 has a center housing 9a and left and right lateral housings 9bL, 9bR fixed to respective side surfaces of the center housing 9a.

The side surfaces on the outboard side of the lateral housings 9bL, 9bR, and the inner side walls 4cL, 4cR, are fixed to each other by a plurality of bolts. Thus, the two electric motors 2L, 2R are fixed to both left and right ends of the power transmission device housing 9. The center housing 9a is provided with a partition wall 11 at the center. The power transmission device housing 9 is divided into two chambers at the left and the right by the partition wall 11, and these parts house a body portion of the power transmission device 3. The body portion of the power transmission device 3 is symmetric between the left and the right, and includes the input gear shafts 12L, 12R, the intermediate gear shafts 13L, 13R, the output gear shafts 14L, 14R, and the torque difference amplification device 30.

Each of the input gear shafts 12L, 12R has an input gear 12a to which a power is transmitted from the corresponding motor shaft 5a. Rolling bearings 17a are provided in bearing fitting holes formed in the partition wall 11, and rolling bearings 17b are provided in bearing fitting holes formed in the left and right lateral housings 9bL, 9bR. Both ends of each input gear shaft 12L, 12R are rotatably supported by the power transmission device housing 9 via the rolling bearings 17a, 17b. The input gear shafts 12L, 12R have a hollow structure. The inboard-side ends of the motor shafts 5a are inserted into the hollow inner parts of the input gear shafts 12L, 12R. The input gear shafts 12L, 12R and the motor shafts 5a are spline-coupled with each other ("serration" coupling is also included; also for spline coupling below, "serration" coupling is included).

Figure 3:
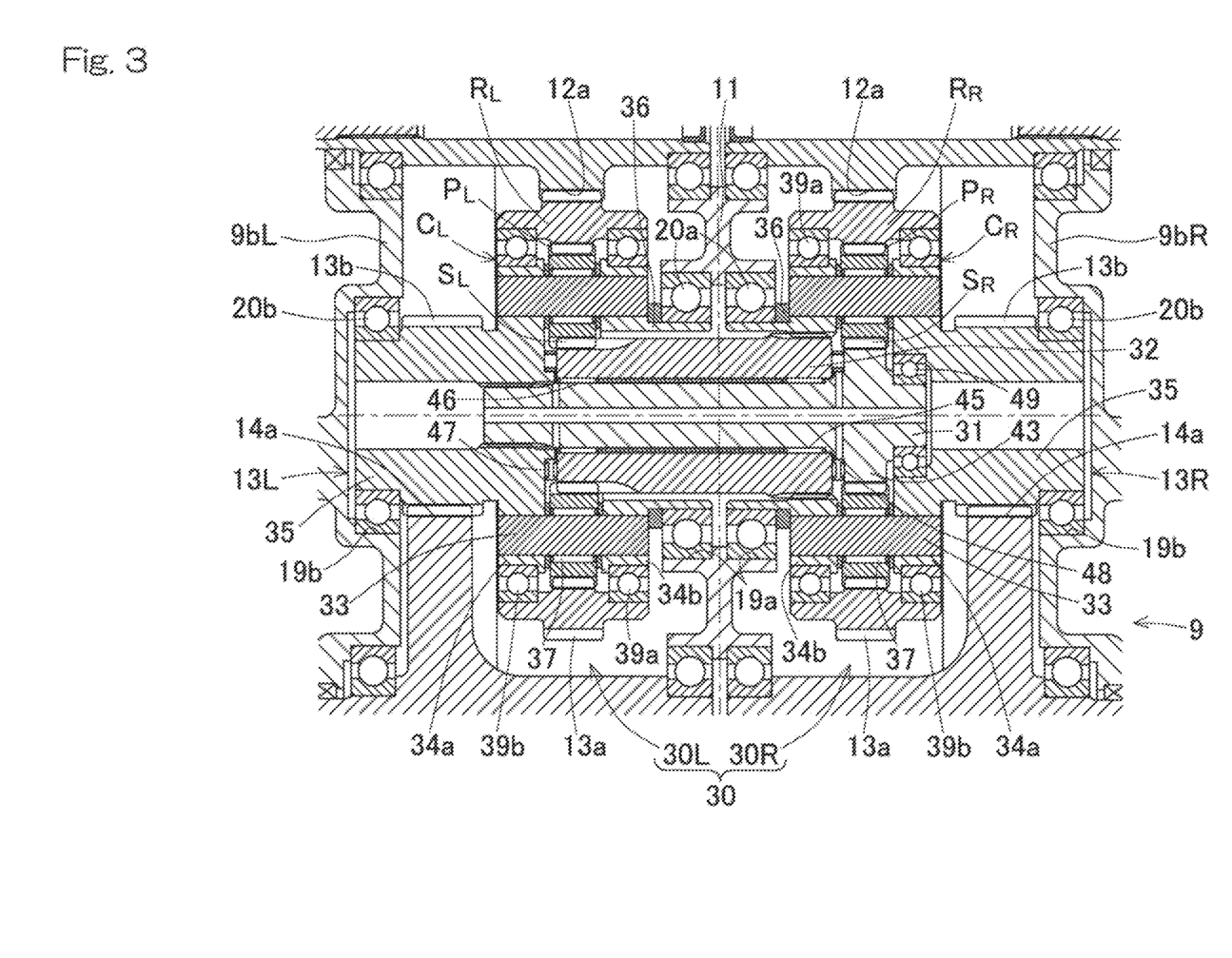
FIG. 3 is an enlarged sectional view showing a torque difference amplification device part of the vehicle driving device shown in FIG. 1.

As shown in FIG. 3, the left and right intermediate gear shafts 13L, 13R are arranged coaxially. The intermediate gear shafts 13L, 13R have input-side external gears 13a, 13a which are engaged with the input gears 12a, 12a and have a large diameter, and output-side small-diameter gears 13b, 13b which are engaged with output gears 14a, 14a described later. Rolling bearings 20a are provided in bearing fitting holes 19a formed in the partition wall 11, and rolling bearings 20b are provided in bearing fitting holes 19b formed in the left and right lateral housings 9bL, 9bR. Both ends of each intermediate gear shaft 13L, 13R are rotatably supported by the power transmission device housing 9 via the rolling bearings 20a, 20b. The bearing fitting holes 19a, 19b have stepped shapes on which outer ring end surfaces of the rolling bearings 20a, 20b abut, and penetrate so that first and second connection members 31, 32 described later pass therethrough.

To the intermediate gear shafts 13L, 13R, the torque difference amplification device 30 is assembled coaxially with the intermediate gear shafts 13L, 13R. The torque difference amplification device 30 amplifies a difference between torques (driving torques) supplied from the two electric motors 2L, 2R (FIG. 2). The torque difference amplification device 30 has two planetary gear mechanisms 30L, 30R each having three elements and two degrees of freedom. For the planetary gear mechanisms 30L, 30R, in this example, a single-pinion planetary gear mechanism is employed. The two planetary gear mechanisms 30L, 30R are provided coaxially.

The planetary gear mechanisms 30L, 30R have ring gears $R_L$, $R_R$, sun gears $S_L$, $S_R$, planetary gears $P_L$, $P_R$, and planetary carriers $C_L$, $C_R$, respectively. Further, the planetary gear mechanisms 30L, 30R have the first and second connection members 31, 32 shared therebetween. The ring gears $R_L$, $R_R$ are internal gears assembled into the input-side external gears 13a, 13a of the intermediate gear shafts 13L, 13R, respectively. The sun gears $S_L$, $S_R$ are sun gears provided coaxially with the ring gears $R_L$, $R_R$. The planetary gears $P_L$, $P_R$ are revolution gears engaged with the respective ring gears $R_L$, $R_R$ and the respective sun gears $S_L$, $S_R$. The planetary carriers $C_L$, $C_R$ are connected to the planetary gears $P_L$, $P_R$ and provided coaxially with the ring gears $R_L$, $R_R$, respectively. The output-side small-diameter gears 13b, 13b of the intermediate gear shafts 13L, 13R are connected to the planetary carriers $C_L$, $C_R$, respectively.

The first connection member 31 couples the left planetary carrier $C_L$ which is a constituent member of the planetary gear mechanism 30L at the left in the drawing in FIG. 3, and the right sun gear $S_R$ which is a constituent member of the planetary gear mechanism 30R at the right in the drawing in FIG. 3. The second connection member 32 couples the left sun gear $S_L$ which is a constituent member of the planetary gear mechanism 30L at the left in the drawing in FIG. 3, and the right planetary carrier $C_R$ which is a constituent member of the planetary gear mechanism 30R at the right in the drawing in FIG. 3.

The planetary carriers $C_L$, $C_R$ have carrier pins 33, 33 supporting the planetary gears $P_L$, $P_R$, carrier flanges 34a, 34a on the outboard side, and carrier flanges 34b, 34b on the inboard side, respectively. The planetary gears $P_L$, $P_R$ are supported by the carrier pins 33, 33 via needle roller bearings 37, 37, respectively. The carrier flanges 34a, 34a on the outboard side are connected to the outboard-side end portions of the carrier pins 33, 33, respectively. The carrier flanges 34b, 34b on the inboard side are connected to the inboard-side end portions of the carrier pins 33, 33, respectively.

The carrier flanges 34a, 34a on the outboard side have hollow shaft portions 35, 35 extending toward the outboard side, respectively. The outboard-side ends of the hollow shaft portions 35, 35 are supported via the rolling bearings 20b, 20b by the bearing fitting holes 19b, 19b formed in the lateral housings 9bL, 9bR, respectively. The carrier flanges 34b, 34b on the inboard side have hollow shaft portions 36, 36 extending toward the inboard side. The inboard-side ends of the hollow shaft portions 36, 36 are supported via the rolling bearings 20a, 20a by the bearing fitting holes 19a, 19a formed in the partition wall 11, respectively. The rolling bearings 39a, 39b are provided between the ring gear $R_L$ and the outer circumferential surfaces of the carrier flanges 34a, 34b of the planetary gear mechanism 30L at the left in the drawing, and between the ring gear $R_R$ and the outer circumferential surfaces of the carrier flanges 34a, 34b of the planetary gear mechanism 30R at the right in the drawing.

The first and second connection members 31, 32 connecting the two planetary gear mechanisms 30L, 30R to each other are provided so as to penetrate the partition wall 11 which partitions the center housing 9a (FIG. 2) into the left and right chambers. The first and second connection members 31, 32 are located coaxially with each other, and are rotatably supported in the axial direction by a thrust bearing 47 and rotatably supported in the radial direction by a deep groove ball bearing 49. Further, besides the bearings 47, 49, additional bearings 45, 46 and a thrust bearing 48 are provided between the first and second connection members 31, 32. Each of the additional bearings 45, 46 is a needle roller bearing. The second connection member 32 has a hollow shaft, and the first connection member 31 has a shaft to be inserted into the hollow shaft.

The outer circumferential surface on the outboard side at the right in the drawing in FIG. 3, of the second connection member 32, and the hollow shaft portion 36 of the carrier flange 34b on the inboard side, of the planetary carrier $C_R$, have splines to be engaged with each other. Thus, the second connection member 32 is connected to the planetary carrier $C_R$ by spline fitting. Accordingly, the planetary carrier $C_R$ which is a second rotary member rotates integrally with the second connection member 32.

The outer circumferential surface on the outboard side at the left in the drawing in FIG. 3, of the first connection member 31, and the hollow shaft portion 35 of the carrier flange 34a on the outboard side, of the planetary carrier $C_L$, have splines to be engaged with each other. Thus, the first connection member 31 is connected to the planetary carrier $C_L$ by spline fitting. Accordingly, the planetary carrier $C_L$ which is a first rotary member rotates integrally with the first connection member 31.

As described above, the first and second connection members 31, 32 are respectively connected to the planetary carriers $C_L$, $C_R$ by spline fitting. Therefore, the two planetary gear mechanisms 30L, 30R can be divided to the left and the right, and can be assembled into the three-piece-structure power transmission device housing 9 from the left and the right, together with another speed reducing gear shaft. The end portion on the planetary carrier $C_L$ side of the second connection member 32 has, on the outer circumferential surface thereof, an external gear forming the sun gear $S_L$ of the planetary gear mechanism 30L at the left in the drawing in FIG. 3. The external gear forming the sun gear $S_L$ is engaged with the planetary gear $P_L$.

The first connection member 31 has a large-diameter portion 43 at an end on the planetary gear mechanism 30R side at the right in the drawing in FIG. 3. The outer circumferential surface of the large-diameter portion 43 has an external gear forming the sun gear $S_R$ of the planetary gear mechanism 30R at the right in the drawing in FIG. 3. The external gear forming the sun gear $S_R$ is engaged with the planetary gear $P_R$. The thrust bearings 47, 48 are provided at both ends in the axial direction of the second connection member 32. By these thrust bearings 47, 48, axial-direction movements of sliding of the spline fitting parts between the first and second connection members 31, 32 and the planetary carriers $C_L$, $C_R$ are restricted, respectively. An end portion at the right in the drawing in FIG. 3, of the first connection member 31, is supported by the deep groove ball bearing 49 with respect to the planetary carrier $C_R$. The first connection member 31 has an oil hole at the axis thereof.

As shown in FIG. 2, the output gear shafts 14L, 14R have large-diameter output gears 14a, 14a, respectively. Rolling bearings 54a, 54a are provided in bearing fitting holes formed in the partition wall 11, and rolling bearings 54b, 54b are provided in bearing fitting holes formed in the left and right lateral housings 9bL, 9bR, respectively. The output gear shafts 14L, 14R are each rotatably supported by the power transmission device housing 9 via the rolling bearings 54a, 54b.

The outboard-side ends of the output gear shafts 14L, 14R are led out to the outside of the power transmission device housing 9 through openings formed in the lateral housings 9bL, 9bR, respectively. Outer joint portions of constant-velocity joints 65a are spline-coupled with the outer circumferential surfaces at the outboard-side ends of the output gear shafts 14L, 14R that are led out. The constant-velocity joints 65a are connected to the respective drive wheels 61L, 61R (FIG. 1) via intermediate shafts and the like (not shown).

Figure 4:
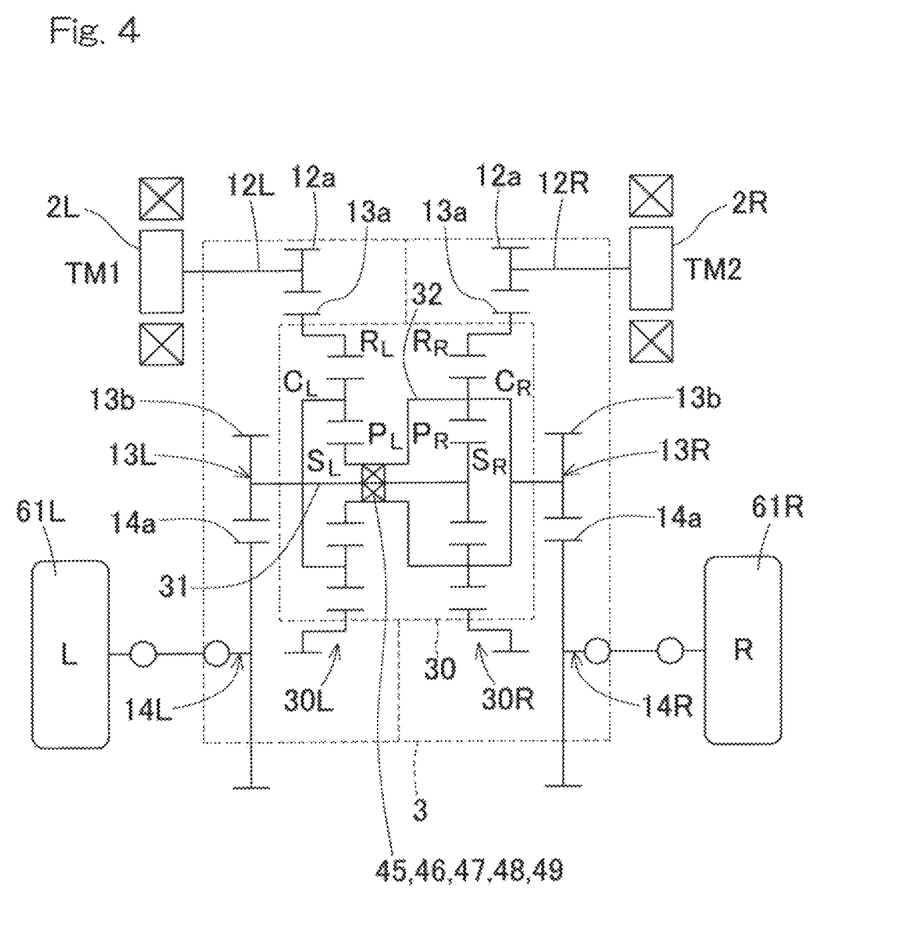
FIG. 4 is a skeleton diagram showing the vehicle driving device shown in FIG. 1.
Figure 5:
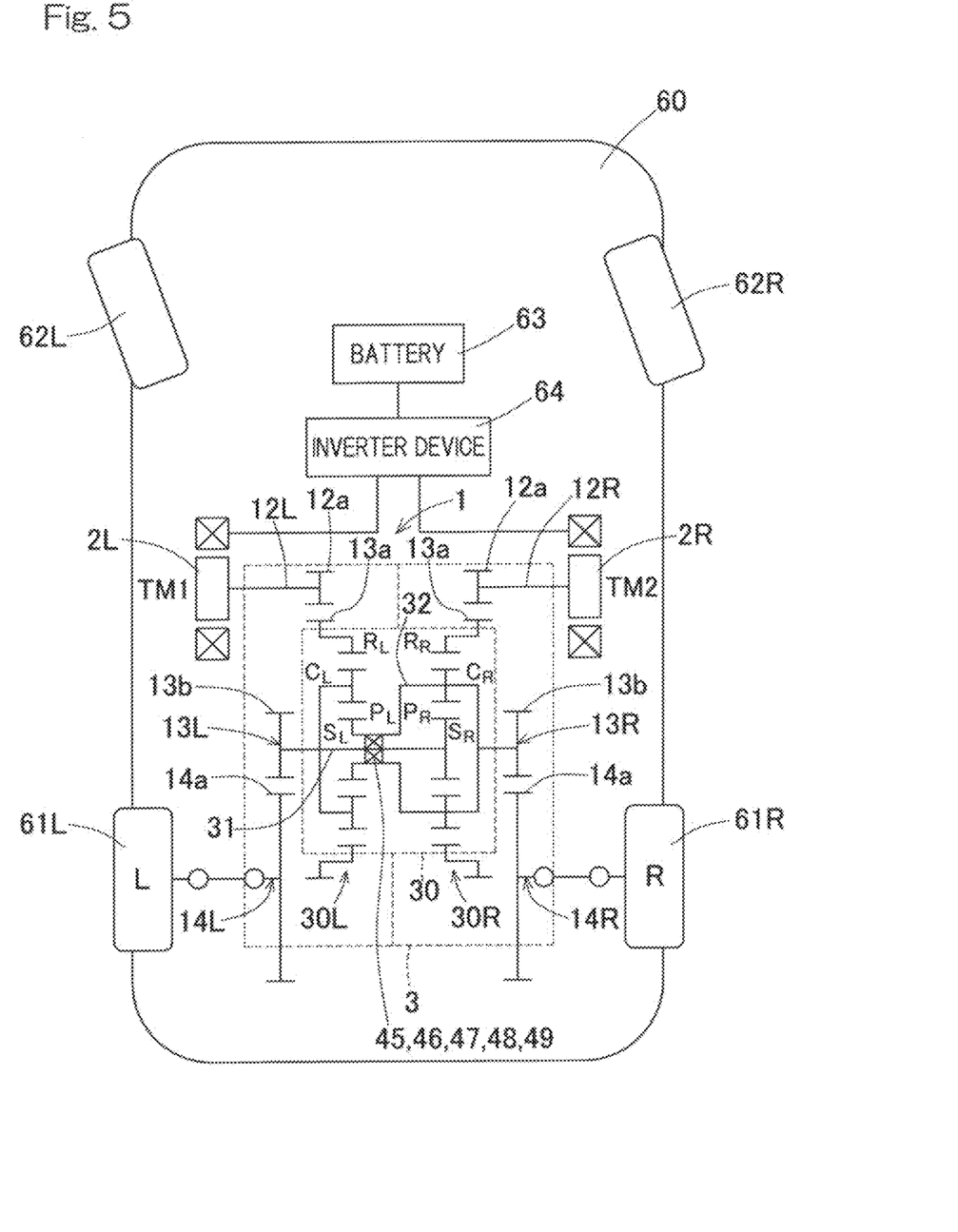
FIG. 5 illustrates an electric vehicle to which the vehicle driving device shown in FIG. 1 is mounted.

FIG. 4 is a skeleton diagram showing the vehicle driving device. FIG. 5 illustrates an electric vehicle to which the vehicle driving device is mounted. As shown in FIG. 4 and FIG. 5, the left and right electric motors 2L, 2R are individually controlled by the drive source control device 67 (FIG. 1), and thus can generate and output different torques.

The torques of the electric motors 2L, 2R are respectively amplified in accordance with the gear ratios between the input gears 12a, 12a of the input gear shafts 12L, 12R and the large-diameter input-side external gears 13a, 13a of the intermediate gear shafts 13L, 13R in the power transmission device 3, and then transmitted to the ring gears $R_L$, $R_R$ of the torque difference amplification device 30. Then, the torque difference between the left and the right is amplified by the torque difference amplification device 30, and the resultant torques are transmitted from the first and second connection members 31, 32 to the output-side small-diameter gears 13b, 13b. Then, the torques are further amplified in accordance with the gear ratios between the output-side small-diameter gears 13b, 13b and the output gears 14a, 14a, respectively, and the resultant torques are outputted to the drive wheels 61L, 61R.

The planetary gear mechanisms 30L, 30R of the torque difference amplification device 30 respectively include: the sun gears $S_L$, $S_R$ and the ring gears $R_L$, $R_R$, which are provided coaxially; the planetary gears $P_L$, $P_R$ located between the sun gears $S_L$, $S_R$ and the ring gears $R_L$, $R_R$; and the planetary carriers $C_L$, $C_R$ which rotatably support the planetary gears $P_L$, $P_R$ and are provided coaxially with the sun gears $S_L$, $S_R$ and the ring gears $R_L$, $R_R$. Here, the sun gears $S_L$, $S_R$ and the planetary gears $P_L$, $P_R$ are external-tooth gears having gear teeth on the outer circumferences, and the ring gears $R_L$, $R_R$ are internal-tooth gears having gear teeth on the inner circumferences. The planetary gears $P_L$, $P_R$ are engaged with the sun gears $S_L$, $S_R$ and the ring gears $R_L$, $R_R$, respectively.

In the planetary gear mechanisms 30L, 30R, when the planetary carriers $C_L$, $C_R$ are fixed, the sun gears $S_L$, $S_R$ and the ring gears $R_L$, $R_R$ rotate in directions opposite to each other, respectively. Therefore, on the velocity diagrams shown in FIG. 6, the ring gears $R_L$, $R_R$ and the sun gears $S_L$, $S_R$ are depicted on opposite sides with respect to the planetary carriers $C_L$, $C_R$.

As shown in FIG. 4 and FIG. 5, the torque difference amplification device 30 is configured such that the left planetary gear mechanism 30L including the sun gear $S_L$, the planetary carrier $C_L$, the planetary gear $P_L$, and the ring gear $R_L$, and the right planetary gear mechanism 30R including the sun gear $S_R$, the planetary carrier $C_R$, the planetary gear $P_R$, and the ring gear $R_R$, are assembled together on a common axis, as described above.

The first connection member 31 is formed to couple the planetary carrier $C_L$ which is a constituent member of the left planetary gear mechanism 30L, and the sun gear $S_R$ which is a constituent member of the right planetary gear mechanism 30R. The second connection member 32 is formed to couple the sun gear $S_L$ which is a constituent member of the left planetary gear mechanism 30L, and the planetary carrier $C_R$ which is a constituent member of the right planetary gear mechanism 30R.

A torque TM1 generated by the left electric motor 2L is transmitted from the input gear shaft 12L to the intermediate gear shaft 13L. Then, while the torque difference between the left and the right is amplified by the torque difference amplification device 30, the torque transmitted to the intermediate gear shaft 13L is sequentially transmitted via the left planetary gear mechanism 30L to the output-side small-diameter gear 13b and the output gear 14a of the intermediate gear shaft 13L, and then the output gear shaft 14L. Then, a driving torque TL (FIG. 6) is outputted from the output gear shaft 14L to the drive wheel 61L. A torque TM2 generated by the right electric motor 2R is transmitted from the input gear shaft 12R to the intermediate gear shaft 13R. Then, while the torque difference between the left and the right is amplified by the torque difference amplification device 30, the torque transmitted to the intermediate gear shaft 13R is sequentially transmitted via the right planetary gear mechanism 30R to the output-side small-diameter gear 13b and the output gear 14a of the intermediate gear shaft 13R, and then the output gear shaft 14R. Then, a driving torque TR (FIG. 6) is outputted from the output gear shaft 14R to the drive wheel 61R.

The second connection member 32 is formed so as to include a hollow shaft extending along the axis of the torque difference amplification device 30, and the first connection member 31 is inserted to the inside of the hollow shaft. The first connection member 31 is formed so as to include a shaft extending along the axis of the torque difference amplification device 30. The first and second connection members 31, 32 are arranged coaxially with each other, and their shafts have an overlapping structure. The bearings 45, 46 are located between the outer circumferential surface of the first connection member 31 and the inner circumferential surface of the second connection member 32. The first and second connection members 31, 32 are supported with each other via the bearings 45, 46. The first and second connection members 31, 32 are rotatably supported by the thrust bearing 47 and the deep groove ball bearing 49. Besides the bearings 47, 49, there are the additional bearings 45, 46 and the thrust bearing 48 that are provided between the first and second connection members 31, 32.

<Driving Torques, Etc.>

Figure 6:
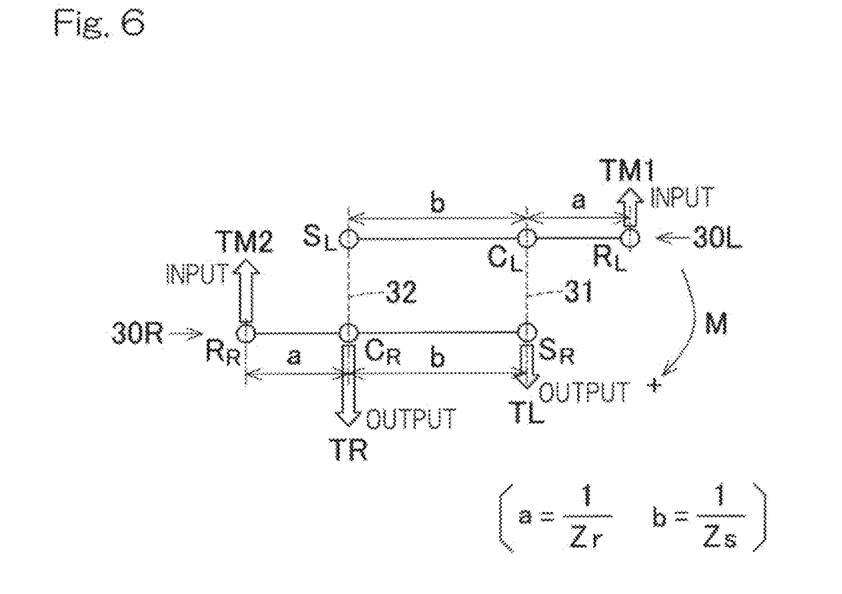
FIG. 6 shows velocity diagrams for illustrating a torque difference amplification factor of the vehicle driving device shown in FIG. 1.

Here, driving torques transmitted by the torque difference amplification device 30 will be described with reference to the velocity diagrams shown in FIG. 6. Since the torque difference amplification device 30 is formed from the assembly of the two identical single-pinion planetary gear mechanisms 30L, 30R, the torque difference amplification device 30 can be expressed by two velocity diagrams as shown in FIG. 6. Here, for facilitating the understanding, the two velocity diagrams are shifted upward and downward, so that the upper side in the drawing in FIG. 6 shows the velocity diagram of the left planetary gear mechanism 30L, and the lower side in the drawing in FIG. 6 shows the velocity diagram of the right planetary gear mechanism 30R.

In practice, as shown in FIG. 5, the torques TM1 and TM2 outputted from the respective electric motors 2L, 2R are respectively inputted to the ring gears $R_L$, $R_R$ via the input-side external gears 13a, 13a engaged with the input gears 12a, 12a of the input gear shafts 12L, 12R, and thus the magnitudes of the torques TM1 and TM2 are changed in accordance with the reduction ratios. In addition, the driving torques TL, TR outputted from the torque difference amplification device 30 are respectively transmitted to the left and right drive wheels 61L, 61R via the output-side small-diameter gears 13b, 13b engaged with the output gears 14a, 14a, and thus the magnitudes of the driving torques TL, TR are changed in accordance with the reduction ratios.

Although the torques are changed in accordance with the above reduction ratios in this vehicle driving device, hereinafter, for facilitating the understanding, as shown in FIG. 6, it is assumed that the reduction ratios are 1, and thus the torques inputted to the ring gears $R_L$, $R_R$ remain TM1, TM2 and the driving torques remain TL, TR, in the description of the velocity diagrams and calculation expressions.

In the two single-pinion planetary gear mechanisms 30L, 30R, gear elements having an identical number of teeth are used. Therefore, in the velocity diagrams, the distance between the ring gear $R_L$ and the planetary carrier $C_L$ is equal to the distance between the ring gear $R_R$ and the planetary carrier $C_R$. This distance is defined as "a". In addition, the distance between the sun gear $S_L$ and the planetary carrier $C_L$ is equal to the distance between the sun gear $S_R$ and the planetary carrier $C_R$. This distance is defined as "b".

The ratio between the length from the respective planetary carriers $C_L$, $C_R$ to the ring gears $R_L$, $R_R$ is equal to the ratio between a reciprocal (1/Zr) of a number Zr of teeth of the ring gear $R_L$, $R_R$. The ratio between the length from the respective planetary carriers $C_L$, $C_R$ to the sun gears $S_L$, $S_R$ is equal to the ratio between a reciprocal (1/Zs) of a number Zs of teeth of the sun gear $S_L$, $S_R$. Therefore, a=(1/Zr) and b=(1/Zs) are satisfied.

From balance of a moment M with a point of $R_R$ as a reference, the following expression (1) is satisfied. In FIG. 6, an arrow direction M in the drawing is the positive direction of the moment.

$$a*TR+(a+b)*TL-(b+2a)*TM1= \qquad (1)$$

From balance of a moment M with a point of $R_L$ as a reference, the following expression (2) is satisfied.

$$-a*TL-(a+b)*TR+(b+2a)*TM2=0 \qquad (2)$$

From expression (1)+expression (2), the following expression (3) is obtained.

$$-b*(TR-TL)+(2a+b)*(TM2-TM1)=0$$

$$(TR-TL)=((2a+b)/b)*(TM2-TM1) \qquad (3)$$

In expression (3), (2a+b)/b represents a torque difference amplification factor α. By substituting a=1/Zr and b=1/Zs, α=(Zr+2Zs)/Zr is obtained. That is, the following torque difference amplification factor α is obtained.

$$\alpha=(Zr+2Zs)/Zr$$

In this example, the torques from the electric motors 2L, 2R (FIG. 5) are inputted to the ring gears $R_L$, $R_R$, respectively, and the torques to the drive wheels 61L, 61R (FIG. 5) are outputted from the sun gears and the planetary carriers, i.e., $S_R+C_L$ and $S_L+C_R$, respectively.

As shown in FIG. 5 and FIG. 6, in the case where a difference between the rotation speeds of the first connection member 31 and the second connection member 32 is small, if different torques TM1, TM2 are generated from the two electric motors 2L, 2R so as to supply an input torque difference ΔTIN (=(TM1−TM2)), the input torque difference ΔTIN is amplified in the torque difference amplification device 30, whereby a driving torque difference α*ΔTIN greater than the input torque difference ΔTIN can be obtained.

That is, even if the input torque difference ΔTIN is small, the input torque difference ΔTIN can be amplified with the torque difference amplification factor α (=(Zr+2Zs)/Zr) by the torque difference amplification device 30. Thus, a driving torque difference ΔTOUT (=α*(TM2−TM1)) greater than the input torque difference ΔTIN can be supplied between the driving torques TL, TR transmitted to the left drive wheel 61L and the right drive wheel 61R.

As shown in FIG. 1, the rotation angular velocities of the left and right electric motors 2L, 2R also depend on the rotation angular velocities of the left and right drive wheels 61L, 61R and the numbers of teeth of the gears included in the power transmission device 3. It is noted that the numbers of teeth of the gears included in the power transmission device 3 are the numbers of teeth of the gears of the input gear shafts 12L, 12R, the intermediate gear shafts 13L, 13R, the output gear shafts 14L, 14R, and the torque difference amplification device 30 in FIG. 2. Hereinafter, the "numbers of teeth of the gears included in the power transmission device 3" are simply referred to as "numbers of teeth of gears".

If the rotation speeds of the left and right electric motors 2L, 2R are respectively defined as ωM1, ωM2, and the rotation speeds of the left and right drive wheels 61L, 61R are respectively defined as ωWL, ωWR, the following relational expressions are satisfied.

$$\omega M1 = A1*\omega WL - A2*\omega WR \qquad (4)$$

$$\omega M2 = -B1*\omega WL + B2*\omega WR \qquad (5)$$

Here, A1, A2, B1, and B2 are constants determined by the numbers of teeth of gears, and they are all positive values. Rotating one of the left and right drive wheels 61L, 61R causes rotations of the two electric motors 2L, 2R. In other words, both of the two electric motors 2L, 2R are to be rotated in order to rotate one drive wheel 61L (61R).

<Relational Expressions of Torques in Vehicle Driving Device>

The torques of the left and right electric motors 2L, 2R are defined as TM1, TM2, the torques of the left and right drive wheels 61L, 61R are defined as TWL, TWR, and the angular accelerations of the left and right drive wheels 61L, 61R are defined as σWL', ωWR'. Then, the following relational expressions are satisfied.

$$TWL = C1*TM1 - C2*TM2 - D1*\sigma WL' + D2*\omega WR' \qquad (6)$$

$$TWR = -E1*TM1 + E2*TM2 + F1*\sigma WL' - F2*\omega WR' \qquad (7)$$

Here, C1, C2, E1, and E2 are constants determined by the numbers of teeth of gears, and they are all positive values. D1, D2, F1, and F2 are constants determined by the numbers of teeth of gears and the moments of inertia of rotary portions such as the drive wheels, the gear shafts, and the electric motors 2L, 2R, and they are all positive values (the same applies to expression (8) and expression (9) described later). That is, the third term and the fourth term on the right-hand side of each of expression (6) and expression (7) represent an inertial force.

It is assumed that an angular acceleration in the accelerating direction with respect to the traveling direction occurs in the left drive wheel 61L of the vehicle ($\omega$WL'>0). As shown in expression (6), by the angular acceleration in the accelerating direction of the left drive wheel 61L, a torque in the decelerating direction acts on the left drive wheel 61L. As shown in expression (7), by the angular acceleration in the accelerating direction of the left drive wheel 61L, a torque in the accelerating direction acts on the right drive wheel 61R.

In the case where an angular acceleration in the decelerating direction occurs in the left drive wheel 61L, torques in directions opposite to the above ones are exerted. That is, by the angular acceleration in the decelerating direction of the left drive wheel 61L, a torque in the accelerating direction acts on the left drive wheel 61L. By the angular acceleration in the decelerating direction of the left drive wheel 61L, a torque in the decelerating direction acts on the right drive wheel 61R.

Such torques on the left and right drive wheels 61L, 61R are exerted also by the angular acceleration of the right drive wheel 61R. Although the angular acceleration of the drive wheel 61L (61R) is used in expression (6) and expression (7), the angular velocities of the electric motors 2L, 2R may be used by using the relational expressions of expression (4) and expression (5).

Here, braking/driving torque command values for the left and right drive wheels 61L, 61R supplied from the high-order ECU 66 are defined as TL, TR. The drive source control device corrects the braking/driving torque command values TL, TR by an amount corresponding to the above torque caused by the angular acceleration of each drive wheel 61L, 61R in accordance with the following expressions (8), (9), and thereby can determine motor torque command values for the two electric motors 2L, 2R.

$$TL + D1 * \omega WL' - D2 * \omega WR' = C1 * TM1 - C2 * TM2 \quad (8)$$

$$TR - F1 \, \omega WL' + F2 * \omega WR = -E1 * TM1 + E2 * TM2 \quad (9)$$

Figure 7:
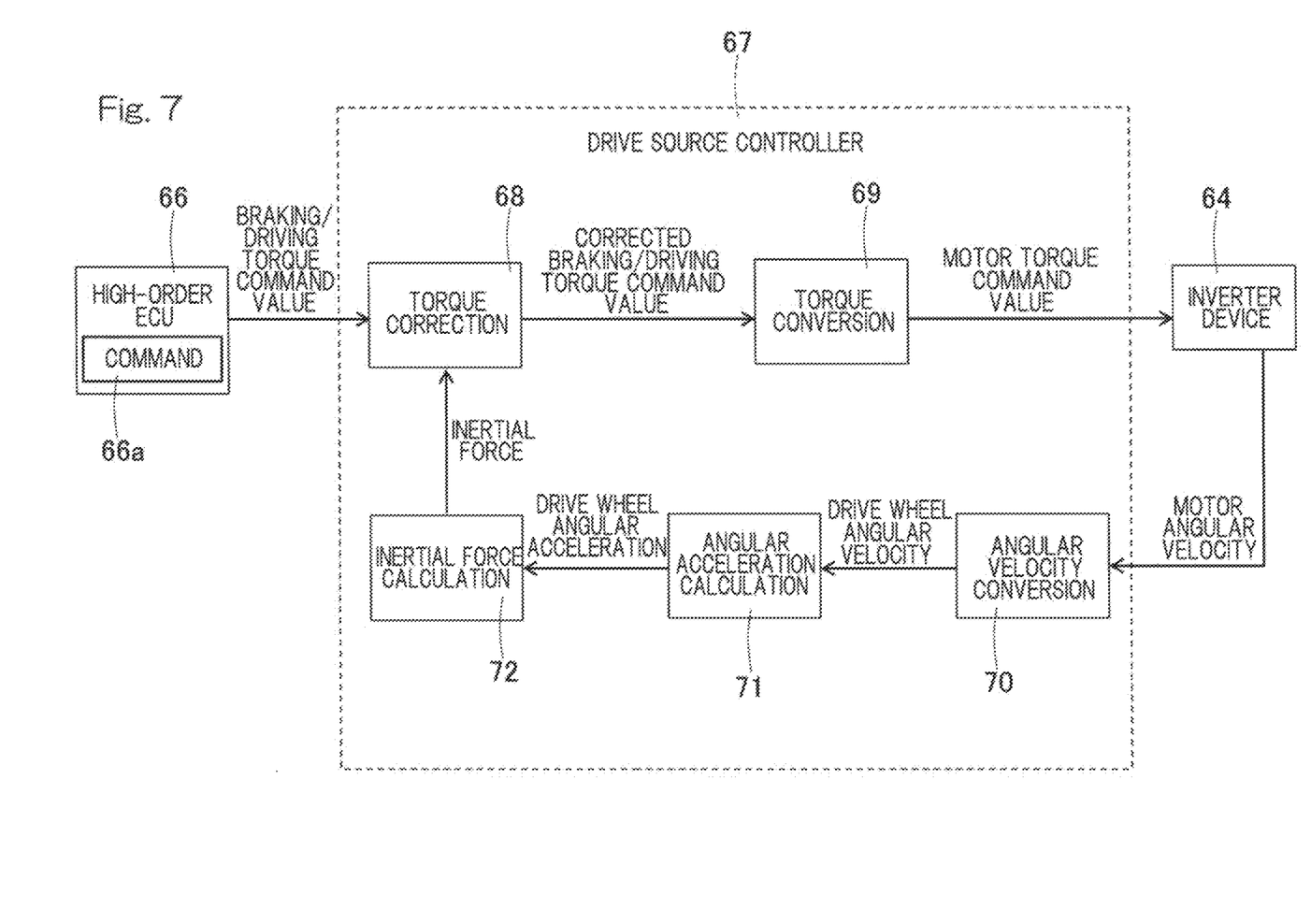
FIG. 7 is a block diagram of a control system of the drive source control device shown in FIG. 1.

FIG. 7 is a block diagram of a control system of the drive source control device 67.

The drive source control device 67 includes a torque correction module (correction module) 68, a torque conversion module 69, an angular velocity conversion module 70, an angular acceleration calculation module 71, and an inertial force calculation module 72. The angular velocity conversion module 70 receives the angular velocities (motor angular velocities) of the two electric motors 2L, 2R (FIG. 1) from the inverter device 64, and converts them to drive wheel angular velocities corresponding to the rotation speeds of the left and right drive wheels 61L, 61R (FIG. 1), respectively. The angular acceleration calculation module 71 calculates the drive wheel angular accelerations of the left and right drive wheels 61L, 61R (FIG. 1) from the respective drive wheel angular velocities supplied from the angular velocity conversion module 70. From the drive wheel angular accelerations of the left and right drive wheels 61L, 61R (FIG. 1), the inertial force calculation module 72 calculates inertial forces to be used for correction for torques by the torque correction module 68.

The inertial forces of the left and right drive wheels 61L, 61R (FIG. 1) calculated by the inertial force calculation module 72 are calculated using the above expression (6) and expression (7). These inertial forces are calculated as values converted to torques occurring in the drive wheels. For the calculation of the inertial forces, constants calculated in advance on the basis of the numbers of teeth of gears and the moments of inertia of the rotary portions such as the drive wheels, the gear shafts, and the left and right electric motors 2L, 2R (FIG. 1), are used, as described above.

The torque correction module 68 calculates corrected braking/driving torque command values in accordance with the above expressions (8) and (9), so as to correct the braking/driving torque command values TL, TR for the left and right drive wheels 61L, 61R (FIG. 1) supplied from a command module 66a of the high-order ECU 66, according to the inertial forces supplied from the inertial force calculation module 72. The corrected braking/driving torque command values are converted or transformed to motor torque command values by the torque conversion module 69, and then outputted to the inverter device 64. In the example shown in FIG. 7, torque correction is performed with the inertial forces that have been converted to torques occurring in the drive wheels. However, correction may be performed after the inertial forces and the braking/driving torque command values are converted to values corresponding to the motor torques.

As described above, the drive source control device 67 according to the present embodiment corrects the braking/driving torque command values for the left and right drive wheels 61L, 61R received from the high-order ECU 66, in consideration of the inertial forces. In the case where change in angular velocity in the vehicle accelerating direction occurs in the first drive wheel 61L (61R), correction is performed by an amount corresponding to the inertial force so as to add a braking force for the second drive wheel 61R (61L), and correction is performed by an amount corresponding to the inertial force so as to add a driving force for the drive wheel 61L (61R) in which change in angular velocity has occurred.

On the other hand, in the case where change in angular velocity in the vehicle decelerating direction occurs in the first drive wheel 61L (61R), correction is performed by an amount corresponding to the inertial force so as to add a driving force for the second drive wheel 61R (61L), and correction is performed by an amount corresponding to the inertial force so as to add a braking force for the drive wheel 61L (61R) in which change in angular velocity has occurred. In other words, the command values are corrected so as to eliminate the influence of the inertial force. In the case where change in angular velocity occurs in both of the left and right drive wheels 61L, 61R, inertial forces determined by their moments of inertia and angular accelerations are calculated, and the command values are corrected by amounts corresponding to these inertial forces.

Therefore, even if undesired change in angular velocity occurs in one or both of the left and right drive wheels 61L, 61R of the vehicle, it is possible to output torques in accordance with the command values supplied from the command module 66a of the high-order ECU 66, which stabilizes the vehicle behavior.

The second embodiment will be described.

In the following description, parts corresponding to the matters previously described in the preceding embodiments are denoted by the same reference characters and the same descriptions are omitted. When only part of the configuration is described, the other part of the configuration is the same as that previously described, unless otherwise specified. The same operations and effects are obtained from the same configuration. Not only parts specifically described in each embodiment can be combined, but also the embodiments can be partially combined with each other unless such a combination particularly causes a problem.

Figure 8:
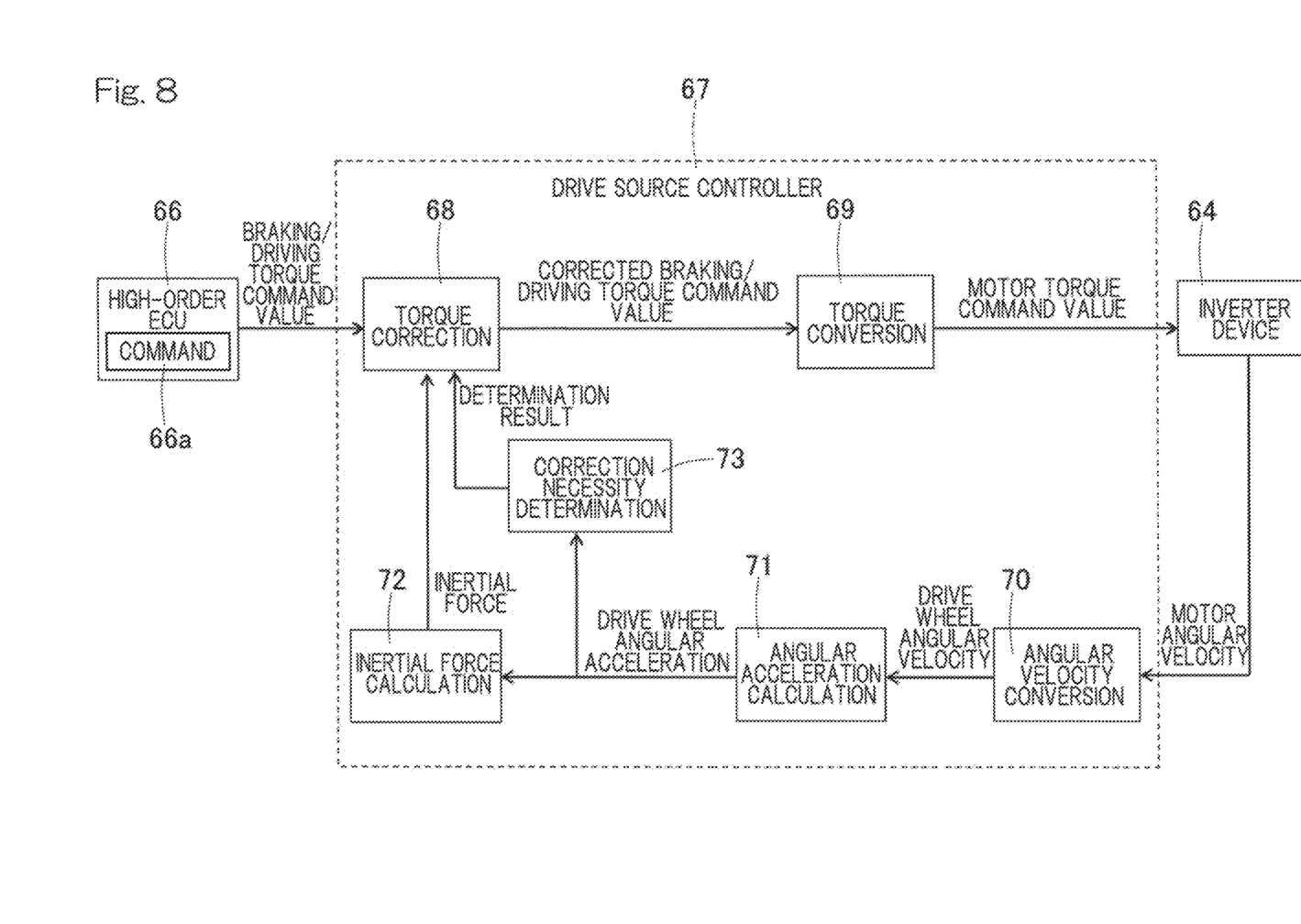
FIG. 8 is a block diagram of a control system of a drive source control device according to the second embodiment of the present invention.

FIG. 8 shows a block diagram of a drive source control device 67 according to the second embodiment. In the drive source control device 67 according to the second embodiment, a correction necessity determination module (determination module) 73 is additionally included as compared to the drive source control device 67 (FIG. 7) according to the second embodiment. The correction necessity determination module 73 determines whether or not torque correction is needed, on the basis of the magnitudes of the left and right drive wheel angular accelerations, and outputs a result of the determination to the torque correction module 68. Specifically, if the angular acceleration of at least one of the drive wheels is greater than a predetermined threshold value, the correction necessity determination module 73 determines that torque correction is needed. In response to a result of the determination that torque correction is needed, the torque correction module 68 corrects the braking/driving torque command values on the basis of the inertial force.

If both of the accelerations of the left and right drive wheels are equal to or smaller than the threshold value, the correction necessity determination module 73 determines that torque correction is not needed, and correction for the braking/driving torque command values by the torque correction module 68 is not performed. As described above, when the angular accelerations of the drive wheels 61L, 61R are small, torque correction is not performed, whereby the calculation load on the drive source control device 67 can be suppressed and unnecessary torque variation due to torque correction being constantly performed can be suppressed.

In the embodiment shown in FIG. 2 and FIG. 3, the first connection member 31 is formed to couple the planetary carrier $C_L$ of the left planetary gear mechanism 30L, and the sun gear $S_R$ of the right planetary gear mechanism 30R, and the second connection member 32 is formed to couple the sun gear $S_L$ of the left planetary gear mechanism 30L and the planetary carrier $C_R$ of the right planetary gear mechanism 30R. However, the configuration is not limited to this example.

For example, the first connection member 31 may be formed to couple the sun gear $S_L$ of the left planetary gear mechanism 30L and the ring gear $R_R$ of the right planetary gear mechanism 30R, and the second connection member 32 may be formed to couple the ring gear $R_L$ of the left planetary gear mechanism 30L and the sun gear $S_R$ of the right planetary gear mechanism 30R.

Furthermore, the second connection member 32 may be formed to couple the planetary carrier $C_L$ of the left planetary gear mechanism 30L and the ring gear $R_R$ of the right planetary gear mechanism 30R.

The drive sources of the vehicle driving device are not limited to electric motors, but may be an internal combustion engine such as a gasoline engine.

The bearings 45, 46 between the first and second connection members 31, 32 may be bearings other than needle roller bearings. For example, rolling bearings such as deep groove ball bearings or angular contact ball bearings may be used.

Although the present invention has been described above in connection with the preferred embodiments with reference to the accompanying drawings, numerous additions, modifications, or deletions can be made without departing from the gist of the present invention. Accordingly, such additions, modifications, or deletions are to be construed as included in the scope of the present invention.

REFERENCE NUMERALS 2L, 2R . . . electric motor (drive source)
3 . . . power transmission device
61L, 61R . . . drive wheel
66a . . . command module
67 . . . drive source control device
68 . . . torque correction module (correction module)
71 . . . angular acceleration calculation module

What is claimed is:

1. A drive source control device for controlling two drive sources included in a vehicle which further includes left and right drive wheels and a power transmission device, the drive source control device comprising:

an angular acceleration calculation module configured to calculate either (a) angular accelerations of the respective left and right drive wheels or (b) angular accelerations of the two respective drive sources, or both (a) and (b); and a correction module configured to, using the angular accelerations calculated by the angular acceleration calculation module, and in accordance with a moment of inertia of a predetermined rotary portion and a number of teeth of a gear of the power transmission device, correct command values for respective outputs of the two respective drive sources based on respective inertial forces of the left and right drive wheels, the command values being supplied from a command module, wherein when a change in an angular velocity in a vehicle accelerating direction occurs in the left drive wheel, the correction module is configured to perform a correction such that a braking force for the right drive wheel is added by an amount corresponding to the respective inertial forces of the left and right drive wheels and such that a driving force for the left drive wheel is added by an amount corresponding to the respective inertial forces of the left and right drive wheels, and when a change in an angular velocity in a vehicle decelerating direction occurs in the left drive wheel, the correction module is configured to perform a correction such that a driving force for the right drive wheel is added by an amount corresponding to the respective inertial forces of the left and right drive wheels and a braking force for the left drive wheel is added by an amount corresponding to the respective inertial forces of the left and right drive wheels.

2. The drive source control device as claimed in claim 1, wherein the power transmission device includes a torque difference amplification device, the torque difference amplification device having two planetary gear mechanisms, the torque difference amplification device amplifying a difference between torques generated by the two drive sources.

3. The drive source control device as claimed in claim 1, further comprising
a determination module configured to determine whether or not the angular acceleration calculated by the angular acceleration calculation module is greater than a threshold value, wherein
only when the determination module determines that the angular acceleration is greater than the threshold value, the correction module corrects the command values for the respective outputs of the two respective drive sources.

4. A vehicle, comprising:
two drive sources;
left and right drive wheels;
a power transmission device disposed among the two drive sources and the left and right drive wheels, the power transmission device being configured to distribute powers from the two drive sources to the left and right drive wheels to drive the left and right drive wheels; and
a drive source control device configured to control the two drive sources, the drive source control device including:
an angular acceleration calculation module configured to calculate: (a) angular accelerations of the respective left and right drive wheels, or (b) angular accelerations of the two respective drive sources, or both (a) and (b), and
a correction module configured to, using the angular accelerations calculated by the angular acceleration calculation module, and in accordance with a moment of inertia of a predetermined rotary portion and a number of teeth of a gear of the power transmission device, correct command values for respective outputs of the two respective drive sources based on respective inertial forces of the left and right drive wheels, the command values being supplied from a command module, wherein
when a change in an angular velocity in a vehicle accelerating direction occurs in the left drive wheel, the correction module is configured to perform a correction such that a braking force for the right drive wheel is added by an amount corresponding to the respective inertial forces of the left and right drive wheels and such that a driving force for the left drive wheel is added by an amount corresponding to the respective inertial forces of the left and right drive wheels, and
when a change in an angular velocity in a vehicle decelerating direction occurs in the left drive wheel, the correction module is configured to perform a correction such that a driving force for the right drive wheel is added by an amount corresponding to the respective inertial forces of the left and right drive wheels and a braking force for the left drive wheel is added by an amount corresponding to the respective inertial forces of the left and right drive wheels.

5. The vehicle as claimed in claim 4, wherein
the power transmission device includes a torque difference amplification device, the torque difference amplification device having two planetary gear mechanisms, the torque difference amplification device amplifying a difference between torques generated by the two drive sources.

6. The vehicle as claimed in claim 4, wherein
the drive source control device further includes a determination module configured to determine whether or not the angular acceleration calculated by the angular acceleration calculation module is greater than a threshold value, and
only when the determination module determines that the angular acceleration is greater than the threshold value, the correction module corrects the command values for the respective outputs of the two respective drive sources.

* * * * *